United States Patent [19]

Ozmeral

[11] Patent Number: 4,510,067
[45] Date of Patent: Apr. 9, 1985

[54] FOAM CONTROL COMPOSITION CONTAINING HIGH FOAMING NONIONIC SURFACTANT AND A POLYOXYALKYLENE COMPOUND

[75] Inventor: Ahmet C. Ozmeral, Baton Rouge, La.

[73] Assignee: BASF Wyandotte Corporation, Wyandotte, Mich.

[21] Appl. No.: 508,159

[22] Filed: Jun. 27, 1983

[51] Int. Cl.³ .................. B01F 17/16; B01F 17/42; C10M 1/20; C11D 17/00
[52] U.S. Cl. ................ 252/174.21; 252/174.22; 252/358; 252/548; 252/DIG. 1; 568/606; 568/613; 568/617
[58] Field of Search .............. 252/174.21, 174.22, 252/548, 358, DIG. 1; 568/606, 613, 617

[56] References Cited

U.S. PATENT DOCUMENTS

| | | | |
|---|---|---|---|
| 3,022,335 | 2/1962 | Lundsted | 252/548 |
| 3,549,543 | 12/1970 | Kirstahler et al. | 252/548 |
| 4,183,821 | 1/1980 | Langdon et al. | 568/624 |
| 4,206,074 | 6/1980 | Perner | 252/351 |
| 4,233,171 | 11/1980 | McLaughlin et al. | 252/135 X |
| 4,272,394 | 6/1981 | Kaneko | 252/174.12 |
| 4,280,919 | 7/1981 | Stoeckist et al. | 252/DIG. 1 |
| 4,306,987 | 12/1981 | Kaneko | 252/99 |
| 4,411,810 | 10/1983 | Dutton et al. | 252/174.22 X |
| 4,436,642 | 3/1984 | Scott | 252/DIG. 1 |

FOREIGN PATENT DOCUMENTS

| | | | |
|---|---|---|---|
| 238408 | 12/1960 | Australia | 252/174.22 |
| 2723139 | 11/1978 | Fed. Rep. of Germany | 252/174.21 |
| 922252 | 3/1963 | United Kingdom | 252/174.22 |

Primary Examiner—John E. Kittle
Assistant Examiner—Mukund J. Shah
Attorney, Agent, or Firm—Bernhard R. Swick

[57] ABSTRACT

The instant invention relates to compositions containing (a) a high-foaming nonionic surfactant and (b) a foam reducing amount of a polyoxyalkylene compound of the formula:

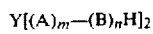

$$Y[(A)_m-(B)_nH]_2$$

wherein Y is the residue formed by the removal of two atoms of active hydrogen from an initiator having a total of not more than 20 carbon atoms, preferably butanediol; A is a hydrophobic, heteric mixture of an oxytetramethylene radical, derived from tetramethylene oxide and a vicinal alkylene oxide radical derived from propylene oxide, B is primarily $C_2H_4O$; n is an integer such that the total weight of said B is about 5 to about 40 percent by weight of the total oxyalkylene residue weight of the compound and the total molecular weight of the hydrophobe, 2m is about 1000 to 3000.

9 Claims, No Drawings

FOAM CONTROL COMPOSITION CONTAINING HIGH FOAMING NONIONIC SURFACTANT AND A POLYOXYALKYLENE COMPOUND

BACKGROUND OF THE INVENTION

1. Field of the Invention

This invention relates to low-foaming compositions which incorporate therein normally high-foaming nonionic surfactants. More specifically, this invention is directed to the reduction or suppression of foaming in compositions containing normally high-foaming nonionic surfactants.

2. Description of the Prior Art

Although detergency has been associated in the minds of many with high foam levels, in some situations foam is an objectionable feature of detergents. For example, in automatic laundry and dishwashing machines that produce a high degree of agitation, excessive foam interferes with the cleaning operation and causes overflow. Unfortunately, many surfactants, and particularly many nonionic surfactants, which are desirable for such applications are characterized by high foaming and thus by themselves are not suitable for applications such as automatic laundry and dishwashing machines. Accordingly, it is known in the prior art to mix low-foaming nonionic surfactants with the high-foaming surfactants as foam control agents.

U.S. Pat. No. 3,862,243, Bellos, discloses oxyethylated then oxybutylated alcohols having the general formula R(OEt)(OBu)OH where R is a hydrocarbon group preferably from about 6 to 22 carbon atoms. These oxyalkylated alcohols are employed as antifoamers, however, there is no mention of using these compounds as defoamers for high-foaming nonionic surfactants.

An article by Kuwamura et al, *Journal American Oil Chemists Society*, 48, pp. 29–34 (1971), entitled "Surface Active Block Copolymers: 1. The Preparation and Some Surface Active Properties of Block Copolymers of Tetrahydrofuran and Ethylene Oxide," discloses surface active block copolymers which are indicated as effective antifoamers for anionic detergents but inefficient for nonionic solutions.

SUMMARY OF THE INVENTION

The instant invention relates to compositions containing (a) a high-foaming nonionic surfactant and (b) a foam reducing amount of a polyoxyalkylene compound of the formula:

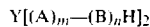

wherein Y is the residue formed by the removal of two atoms of active hydrogen from an initiator having a total of not more than 20 carbon atoms and free of elements other than carbon, hydrogen and oxygen, said initiator preferably being selected from the group consisting of water, alkylene glycols, polyalkylene glycols, alkanols, and, most preferably, 1,4-butanediol; A is a hydrophobic, heteric mixture of an oxytetramethylene radical, derived from tetramethylene oxide and a vicinal alkylene oxide radical derived from propylene oxide, said A being derived from the reaction of said oxides in the molar ratio of tetramethylene oxide: vicinal alkylene oxide of 3:1 to 1:1; B is primarily $C_2H_4O$; m is an interger such that the total weight of said A is about 95 to 60 percent by weight of the total oxyalkylene residue weight of the compound; n is an integer such that the total weight of said B is about 5 to 40 percent by weight of the total oxyalkylene residue weight of the compound and the total molecular weight of the hydrophobe, 2 m is about 1000 to 3000.

The hydrophobe A may optionally but advantageously contain small amounts up to 30 percent by weight of oxyethylene and/or oxybutylene groups while the hydrophile B may also optionally but advantageously contain oxypropylene and oxybutylene groups in amount up to 30 weight percent of the total hydrophilic portion of the molecule. As used herein, reference to the hydrophobic groups, or group A, is considered to include such optional groups even though not specifically mentioned and, similarly, reference to the hydrophilic groups or group B is considered to possibly include such oxypropylene or oxybutylene groups. The preparation of the compounds of the type set forth in the above formula is described in more detail in U.S. Pat. No. 4,183,821.

DETAILED DESCRIPTION OF THE INVENTION

The high-foaming nonionic surfactants which are used in the instant invention may be any suitable member of any of the generally known types of nonionic surfactants, i.e., alkoxylated alkyl phenol, oxyalkylated fatty acids, oxyalkylated fatty alcohols, alkoxylated fatty amines, oxyalkylated fatty sorbitan esters, block copolymers containing EO and PO units based on ethylene glycol or propylene glycol, block copolymers containing EO or PO units based upon N,N,N',N',-tetrakis(2-hydroxypropyl)ethylene diamine, etc.

As used herein, a "—high-foaming, nonionic surfactant—" is one which will reach a foam height of 600 mm within ten minutes at a flow rate of 400 ml per minute when tested with a dynamic foam machine such as the one described by Reich et al in *Soap and Chemical Specialties*, vol. 37, page 55, (April, 1961). Those of ordinary skill in the art will know which block copolymers that are alkoxylation products of ethylene glycol or propylene glycol are high foamers. They will also know how to prepare such surfactants. Such surfactants are generally employed in various proportions with other ingredients in the nature of abrasives, fillers, dyes, perfume, soil, anti redeposition agents, optical brightners, etc. to form completed cleaning compositions.

The high-foaming nonionics to which this invention is particularly applicable correspond to the formula:

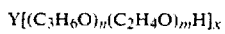

wherein Y is the residue of an organic compound having from about 1 to 6 carbon atoms and containing x reactive hydrogen atoms in which x has a value of at least about 1, n has a value such that the molecular weight of the polyoxypropylene hydrophobic base is about 1500 to 5000 and m represents from about 30 to 90 weight percent of the molecule. Falling within the scope of the definition for Y are, for example, propylene glycol, glycerine, pentaerythritol, trimethylolpropane, ethylene diamine and the like. The oxypropylene chains optionally, but advantageously, contain small amounts of oxyethylene and oxybutylene groups and the oxyethylene chains also optionally, but advantageously, contain small amounts of oxypropylene and oxybutylene groups. These compositions are more particularly described in U.S. Pat. Nos. 2,677,700 and 2,674,619.

Nonionics to which this invention is particularly applicable are those wherein Y is propylene glycol, wherein the resulting formula is

wherein n has a value such that the molecular weight of the polyoxypropylene hydrophobic base is about 1800 to 3200 and m has a value such that the oxyethylene content of the molecule is from about 30 to 90 weight percent.

Another preferred nonionic surfactant is one wherein Y is the residue of ethylene diamine wherein the resulting formula is

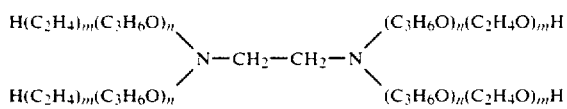

wherein n has a value such that the molecular weight of the polyoxypropylene hydrophobic base is from about 1500 to 5000, and m has a value such that the oxyethylene content of the molecule is from about 30 to 90 weight percent.

The manner of using the foam-reducing agent by incorporating it in a foam reducing amount, as designated above, in a dishwashing, laundry or other detergent composition requiring low-foam characteristics is well known to those skilled in the art. Such a composition will contain, as indicated above, a substantial proportion of the high-foaming nonionic surfactant. Thus, in one aspect, the present invention comprises a composition consisting of a high-foaming, nonionic surfactant into which there has been incorporated a suitable amount of the tetrahydrofuran, propylene oxide, ethylene oxide compound, as described above, the amount being such as to provide a ratio of the tetrahydrofuran compound to high-foaming, nonionic of 0.5:10 to 2.0:10 by weight. In other words, the tetrahydrofuran, alkylene oxide compound may simply be added to the high-foaming, nonionic surfactant in order to make it a lower foaming product in whatever composition it may ultimately be used, or the invention may be practiced by making a composition for a particular end use in which the high-foaming, nonionic surfactant and the tetrahydrofuran, alkylene oxide compound are added as separate ingredients.

The amount of the tetrahydrofuran, alkylene oxide compound used is defined functionally as a "foam-reducing amount." For the purposes of the present invention, the term "free-reducing amount" may be defined as one not exceeding 20 percent by weight of the high-foaming, nonionic surfactant.

The compositions of this invention may also contain other ingredients such as other surfactants, builders, bleaches, abrasives, fillers, dyes, perfumes, soil anti-redeposition agents, optical brighteners, etc. The amounts of these components in a detergent or cleaning composition are from about 5 to 90 percent by weight. When used for washing purposes in either a dishwashing or laundry solution, such solution will contain about 0.1 to 5 and preferably 0.1 to 0.5 percent by weight of the total detergent composition, balance water. For convenience in handling, transportation and marketing, a dry or liquid concentrate may be prepared comprising about 20 to 60 percent by weight of the above detergent composition, balance inert ingredients such as sodium sulfate for a dry concentrate or water for a liquid concentrate.

The examples which follow illustrate in more detail the practice of the instant invention. Unless otherwise indicated, all temperatures are in degrees centigrade and all parts, percentages, etc., are by weight.

EXAMPLE 1-6

In these examples a high-foaming, nonionic surfactant indicated in the Table below as nonionic No. 1 was tested alone and in combination with five other nonionics. Nonionic No. 1 is the polyoxyethylene adduct of a polyoxypropylene hydrophobic base having a molecular weight of the hydrophobic base of about 1750 and wherein the oxyethylene content is about 80 weight percent of the molecule.

The five other nonionics may be defined as follows:

Nonionic No. 2 is the polyoxyethylene adduct of a polyoxypropylene hydrophobic base having a molecular weight of about 1750 for the hydrophobic base and wherein the oxyethylene content is about 10 weight percent of the molecule.

Nonionic No. 3 is the polyoxyethylene adduct of a polyoxypropylene condensed with ethylene diamine wherein the oxypropylene hydrophobic base has a molecular weight of about 2500 and the oxyethylene content is about 10 percent by weight of the molecule.

Nonionic No. 4 is the polyoxyethylene adduct of a polyoxypropylene condensed with ethylene diamine wherein the oxypropylene hydrophobic base has a molecular weight of about 4500 and the oxyethylene content is about 10 weight percent of the molecule.

Nonionic No. 5 is the polyoxyalkylene compound having the following formula:

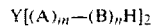

wherein Y is the residue formed by the removal of two atoms of hydrogen from 1,4-butanediol, A is a hydrophobic heteric mixture of an oxytetramethylene radical derived from tetrahydrofuran and a vicinal alkylene oxide radical derived from propylene oxide in the molar ratio of tetramethylene oxide:vicinal alkylene oxide of 1:1; B is an oxyethylene chain, m is an integer such that the total molecular weight of A is about 2000 and n is an integer such that the weight of B is 30 percent of the total molecular weight of the compound.

Nonionic No. 6 is the polyoxyalkylene compound having the following formula:

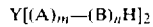

wherein Y is the residue formed by the removal of two atoms of hydrogen from 1,4-butanediol, A is a hydrophobic heteric mixture of an oxytetramethylene radical derived from tetrahydrofuran and a vicinal alkylene oxide radical derived from propylene oxide in the molar ratio of tetramethylene oxide:vicinal alkylene oxide of 1:1; B is an oxyethylene chain, m is an interger such that the total molecular weight of A is about 5000 and n is an integer such that the weight of B is 20 percent of the total molecular weight of the compound.

In the examples which follow, the compositions indicated in the Table as Nos. 1 through 6 were each diluted with water to form an aqueous solution containing 0.1 percent by weight of the composition. The foaming power of the compositions was measured by using a dynamic foam machine such as the one described by Reich et al, *Soap and Chemical Specialties*, vol. 37, page 55, (April, 1961). The results of these tests are given in the table below. The table shows that foam heights were measured using a 400 cc per minute flow. The foam height of each composition at intervals of 0.5, 2, 5 and 10 minutes of flow are shown in the Table.

TABLE

| Example No. | Composition | Dynamic Foam Height (mm) 400 cc/min., 120° F. | | | |
|---|---|---|---|---|---|
| | | 0.5 min. | 2.0 min. | 5.0 min. | 10.0 min. |
| 1 | 100% Nonionic No. 1 | 140 | 460 | 600 | — |
| 2 | 90% Nonionic No. 1 10% Nonionic No. 2 | 50 | 90 | 135 | 160 |
| 3 | 90% Nonionic No. 1 10% Nonionic No. 3 | 45 | 60 | 70 | 75 |
| 4 | 90% Nonionic No. 1 10% Nonionic No. 4 | 60 | 105 | 165 | 260 |
| 5 | 90% Nonionic No. 1 10% Nonionic No. 5 | 40 | 45 | 50 | 50 |
| 6 | 90% Nonionic No. 1 10% Nonionic No. 6 | 55 | 85 | 130 | 170 |

The only defoamer within the scope of the invention is nonionic No. 5 from which it can be seen that greatly reduced foam heights are achieved as compared to nonionics Nos. 2, 3, 4 and 6. Nonionics 2, 3 and 4 are well known prior art low-foaming nonionics while nonionic No. 6 is a tetrahydrofuran based polyoxyalkylene compound of the formula employed according to this invention but it has a molecular weight of the hydrophobe of 5000 which is greatly in excess of the 3000 molecular weight maximum permissible according to the instant invention. Thus, the superior foam-reducing properties of the instant invention are clearly shown by these Examples.

EXAMPLE 7

A detergent composition is prepared consisting of by weight 12.0 percent nonionic No. 1; 1.0 percent nonionic No. 5; 40 percent sodium citrate; 1.0 percent carboxymethylcellulose; 0.5 percent perfume and 45.5 percent sodium sulfate.

A washing solution for laundry purposes is prepared by mixing the detergent composition of Example 2 with water in amount of 0.15 percent by weight of the detergent composition, balance water. This washing solution is characterized by low-foaming when used in an automatic washing machine and has good cleaning properties.

EXAMPLE 8

A detergent composition similar to Example 7 is prepared wherein a nonionic surfactant as described for nonionic No. 5 but having a molecular weight of the polyoxypropylene groups of 3000 and containing 20 percent by weight oxyethylene groups is substituted for nonionic No. 5. A washing solution prepared from this detergent composition containing 0.15 percent by weight of the detergent composition, balance water, when employed for washing clothes in an automatic washing machine exhibits low-foaming properties and excellent cleaning.

EXAMPLE 9

A detergent composition similar to Example 7 is prepared wherein a nonionic surfactant as described for nonionic No. 5 but having a molecular weight of the polyoxypropylene groups of 1000 and containing 40 percent by weight oxyethylene groups is substituted for nonionic No. 5. A washing solution prepared from this detergent composition containing 0.15 percent by weight of the detergent composition, balance water, when employed for washing clothes in an automatic washing machine exhibits low-foaming properties and excellent cleaning.

EXAMPLE 10

A composition similar to Example 7 is prepared with the exception that a nonionic similar to nonionic No. 1 having a molecular weight of the hydrophobe of about 2250 and containing 40 percent by weight oxyethylene groups is substituted for nonionic No. 1. A washing solution prepared from this detergent composition containing 0.15 percent by weight of the detergent composition, balance water, when employed for washing clothes in an automatic washing machine exhibits low-foaming properties and excellent cleaning.

The embodiments of this invention in which an exclusive property or privilege is claimed are defined as follows:

1. A composition comprising (a) a high-foaming, nonionic surfactant and (b) a foam-reducing amount of a polyoxyalkylene compound having the formula $$Y[(A)_m-(B)_nH]_2$$

wherein Y is the residue formed by the removal of two atoms of active hydrogen from an initiator having a total of not more than 20 carbon atoms and free of elements other than carbon, hydrogen and oxygen, A is a hydrophobic, heteric mixture of an oxytetramethylene radical, derived from tetramethylene oxide and vicinal alkylene oxide radical derived from propylene oxide, said A being derived from the reaction of said oxides in the molar ratio of tetramethylene oxide:vicinal alkylene oxide of 3:1 to 1:1; B is $C_2H_4O$; m is an integer such that the total weight of said A is about 95 to 60 percent by weight of the total oxyalkylene residue weight of the compound; n is an integer such that the total weight of said B is about 5 to 40 percent by weight of the total oxyalkylene residue weight of the compound and the total molecular weight of the hydrophobe, 2 m is about 1000 to 3000.

2. The composition of claim 1 wherein said high-foaming, nonionic surfactant has the following formula $$Y[(C_3H_6O)_n(C_2H_4O)_mH]_x$$

wherein Y is the residue of an organic compound having from about 1 to 6 carbon atoms and containing x reactive hydrogen atoms in which x has a value of at least about 1, n has a value such that the molecular weight of the polyoxypropylene hydrophobic base is about 1500 to 5000 and m represents about 30 to 90 weight percent of the molecule.

3. The composition of claim 2 wherein said high-foaming, nonionic surfactant is selected from the group consisting of compounds having the formula $$H(C_2H_4O)_m(C_3H_6O)_n(C_2H_4O)_mH$$

wherein n has a value such that the molecular weight of the polyoxypropylene hydrophobic base is about 1800 to 3200 and m has a value such that the oxyethylene content of the molecule is from about 30 to 90 weight percent and compounds having the formula:

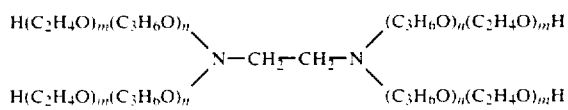

wherein n has a value such that the molecular weight of the polyoxypropylene hydrophobic base is from about 1500 to 5000, and m has a value such that the oxyethylene content of the molecule is from about 30 to 90 weight percent.

4. The composition of claim 3 wherein the initiator of said tetramethylene oxide-propylene oxide compound is a butane diol.

5. The composition of claim 4 wherein the weight ratio of said tetramethylene oxide-propylene oxide compound to high-foaming nonionic is from about 0.5:10 to 2:10.

6. The composition of claim 5 including about 5 to 90 percent by weight conventional detergent additives.

7. A detergent concentrate comprising 20 to 60 percent by weight of the detergent composition of claim 6, balance inert ingredients or water.

8. A washing solution comprising 0.1 percent to 5 percent by water of the detergent composition of claim 6, balance water.

9. A method of reducing foaming of a high-foaming, nonionic surfactant which comprises adding thereto a tetrahydrofuran based polyoxyalkylene compound having the structural formula:

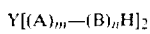

wherein Y is the residue formed by the removal of two atoms of active hydrogen from an initiator having a total of not more than 20 carbon atoms and free of elements other than carbon, hydrogen and oxygen, A is a hydrophobic, heteric mixture of an oxytetramethylene radical, derived from tetramethylene oxide and a vicinal alkylene oxide radical derived from propylene oxide, said A being derived from the reaction of said oxides in the molar ratio of tetramethylene oxide:vicinal alkylene oxide of 3:1 to 1:1; B is $C_2H_4O$ m is an integer such that the total weight of said A is about 95 to 60 percent by weight of the total oxyalkylene residue weight of the compound; n is an integer such that the total weight of B is about 5 to 40 percent by weight of the total oxyalkylene residue weight of the compound and the total molecular weight of the hydrophobe, 2 m is about 1000 to 3000, the ratio of said tetrahydrofuran based polyoxyalkylene compound to said high-foaming, nonionic surfactant being from about 0.5:10 to 2:10.

* * * * *